США008920149B2

(12) United States Patent
Hossain et al.

(10) Patent No.: US 8,920,149 B2
(45) Date of Patent: Dec. 30, 2014

(54) SINGLE-SCREW COMPRESSOR HAVING AN ADJUSTMENT MECHANISM FOR ADJUSTING A COMPRESSION RATIO OF THE COMPRESSION CHAMBER

(75) Inventors: Mohammod Anwar Hossain, Sakai (JP); Hiromichi Ueno, Sakai (JP); Masanori Masuda, Sakai (JP)

(73) Assignee: Daikin Industries, Ltd., Osaka (JP)

( * ) Notice: Subject to any disclaimer, the term of this patent is extended or adjusted under 35 U.S.C. 154(b) by 215 days.

(21) Appl. No.: 13/635,560

(22) PCT Filed: Mar. 2, 2011

(86) PCT No.: PCT/JP2011/001231
§ 371 (c)(1),
(2), (4) Date: Sep. 17, 2012

(87) PCT Pub. No.: WO2011/114637
PCT Pub. Date: Sep. 22, 2011

(65) Prior Publication Data
US 2013/0011291 A1 Jan. 10, 2013

(30) Foreign Application Priority Data

Mar. 18, 2010 (JP) ................................. 2010-062650

(51) Int. Cl.
| F03C 4/00 | (2006.01) |
| F04C 2/00 | (2006.01) |
| F04C 18/00 | (2006.01) |
| F04C 18/52 | (2006.01) |
| F04C 28/06 | (2006.01) |
| F04C 28/12 | (2006.01) |
| F04C 29/12 | (2006.01) |

(52) U.S. Cl.
CPC ................ *F04C 18/52* (2013.01); *F04C 28/06* (2013.01); *F04C 28/12* (2013.01); *F04C 29/126* (2013.01)

USPC .......................................... 418/195; 418/201.2

(58) Field of Classification Search
CPC ........ F04C 18/16; F04C 18/084; F04C 18/48; F04C 18/50; F04C 18/52; F04C 18/54; F04C 28/06; F04C 28/12; F04C 29/126
USPC .................... 418/194–195, 197, 201.1–201.2
See application file for complete search history.

(56) References Cited

U.S. PATENT DOCUMENTS

| 3,073,514 | A | * | 1/1963 | Bailey et al. ................ 418/201.2 |
| 3,424,373 | A | * | 1/1969 | Gardner ....................... 418/201.2 |
| 6,659,729 | B2 | * | 12/2003 | Hattori et al. ................... 417/282 |
| 2006/0039805 | A1 | | 2/2006 | Gotou et al. |

FOREIGN PATENT DOCUMENTS

| JP | 55-28762 U | 2/1980 |
| JP | 56-35586 U | 4/1981 |

(Continued)

OTHER PUBLICATIONS

International Search Report of corresponding PCT Application No. PCT/JP2011/001231, dated on May 24, 2011.

*Primary Examiner* — Theresa Trieu
(74) *Attorney, Agent, or Firm* — Global IP Counselors

(57) ABSTRACT

A screw compressor includes a screw rotor, a gate rotor, a drive mechanism to rotate the screw rotor, a cylinder, a discharge port and an adjustment mechanism. The screw rotor has an outer periphery with a helical groove engaged with radially arranged gates of the gate rotor. First and second axial ends of the screw rotor form suction and discharge sides, respectively. The cylinder accommodates the screw rotor to define a compression chamber in the helical groove. Fluid in the compression chamber flows through the discharge port toward the discharge side of the screw rotor. The adjustment mechanism is configured to adjust a compression ratio of the compression chamber within a predetermined range. The adjustment mechanism adjusts the compression ratio to a minimum compression ratio immediately before or when operation of the adjustment mechanism is stopped.

5 Claims, 11 Drawing Sheets

(56) References Cited

FOREIGN PATENT DOCUMENTS

| JP | 57-24487 A | 2/1982 |
| JP | 5-187373 A | 7/1993 |
| JP | 5-332265 A | 12/1993 |
| JP | 2004-137934 A | 5/2004 |
| JP | 2010-24983 A | 2/2010 |

* cited by examiner

SINGLE-SCREW COMPRESSOR HAVING AN ADJUSTMENT MECHANISM FOR ADJUSTING A COMPRESSION RATIO OF THE COMPRESSION CHAMBER

CROSS-REFERENCE TO RELATED APPLICATIONS

This U.S. National stage application claims priority under 35 U.S.C. §119(a) to Japanese Patent Application No. 2010-062650, filed in Japan on Mar. 18, 2010, the entire contents of which are hereby incorporated herein by reference.

TECHNICAL FIELD

The present disclosure relates to single-screw compressors, and more particularly to techniques for improving durability of a gate rotor.

BACKGROUND ART

Single-screw compressors including compression mechanisms for compressing refrigerant by rotations of screw rotors have been known in the art.

In a single-screw compressor (hereinafter referred to simply as a screw compressor) described in Japanese Patent Publication No. 2004-137934, for example, a screw rotor is housed in a cylinder, and a gate rotor is engaged with this screw rotor. In this manner, in helical grooves formed in the outer periphery of the screw rotor, a compression chamber is defined to be surrounded by a gate of the gate rotor, the screw rotor, and the inner wall of the cylinder. In the screw compressor, a suction port is formed at an end (a suction side) along the axis of the screw rotor, and a discharge port is formed at the other end (a discharge side) along the axis of the screw rotor.

During operation of the single-screw compressor, a fluid flows into the helical grooves through the suction port. In the helical grooves, a compression chamber is defined with rotation of the screw rotor. When the screw rotor in this state further rotates, the volume of the compression chamber enclosing the fluid gradually decreases. Accordingly, the fluid in the compression chamber is gradually compressed. Then, when the screw rotor in this state further rotates, the compression chamber and the discharge port communicate with each other. Consequently, the high-pressure fluid in the compression chamber is discharged to a predetermined space through the discharge port.

SUMMARY

Technical Problem

Immediately after operation of the screw compressor as described above has stopped, a so-called reverse differential pressure phenomenon in which the pressure of a fluid in the helical grooves is lower than that in the suction side of the screw rotor occurs. This phenomenon will be specifically described.

During operation of the screw compressor, a predetermined differential pressure (a so-called level differential pressure) occurs between the discharge side and the suction side of the screw rotor. Accordingly, immediately after operation of the screw compressor has stopped, the screw rotor rotate reversely, i.e., in the direction opposite to that in normal operation, resulting in that a fluid in the discharge side of the screw rotor flows back to the suction side of the screw rotor through the helical grooves in some cases. When the fluid flows back in this manner, the volume of the chamber enclosing the fluid gradually increases, and the fluid gradually expands, thereby reducing the pressure. The degree (i.e., the expansion ratio) of such a pressure decrease of the fluid is determined based on the compression ratio of a fluid in the screw rotor during normal operation.

On the other hand, immediately after the stop of the screw compressor, the level differential pressure is equalized. Accordingly, the pressure in the discharge side of the screw rotor quickly decreases, and the pressure in the suction side of the screw rotor quickly increases. In this state, when the fluid flows back in the manner as described above, the fluid in the discharge side whose pressure is lower than that in normal operation is disadvantageously subjected to pressure reduction at the predetermined expansion ratio described above. On the other hand, the fluid in the suction side has a pressure higher than that in normal operation. Accordingly, immediately after the screw compressor has stopped, a so-called reverse differential pressure phenomenon in which the pressure of the fluid in the helical grooves is lower than that of the fluid in the suction side of the screw rotor might occur.

When the magnitude correlation between the pressure of the fluid in the helical grooves and the pressure of the fluid in the suction side is reversed from that in normal operation, the gate for partitioning the inside of the helical grooves is pushed toward the direction opposite to that in the normal operation. This phenomenon will be specifically described below.

The gate of the gate rotor is disposed to separate the inside of the helical grooves from external space (i.e., space at the suction side) outside the helical grooves accommodate the gate rotor. Accordingly, during normal operation in which the pressure in the helical grooves is higher than that in external space outside the helical grooves, the pressure of the fluid acts on the gate in the direction from the inside of the helical grooves to the outside of the helical grooves. For this reason, the gate rotor is designed so as to ensure a predetermined sealing property between the gate and the screw rotor based on the state in the normal operation described above as standard.

On the other hand, when the above-described reverse differential pressure phenomenon occurs immediately after the screw compressor has stopped, the pressure in the helical grooves falls below the pressure of the external space outside the helical grooves. Accordingly, the pressure of the fluid acts on the gate in the direction from the outside of the helical grooves to the inside of the helical grooves, and thus, the gate is pushed in the direction opposite to that in the above-described normal operation. When the screw rotor in this state rotates reversely, the gate disadvantageously comes into contact with the screw rotor at a position different from that in the normal operation. Consequently, problems such as removal of the resin gate from the arm of the gate rotor or accelerated abrasion of a sealing part of the gate might arise.

It is therefore an object of the present disclosure to reduce occurrence of a reverse differential pressure phenomenon immediately after a screw compressor has stopped, and further to improve durability of a gate rotor

Solution to the Problem

In a first aspect of the present disclosure, a single-screw compressor includes: a screw rotor (40) having an outer periphery in which a helical groove (41) is formed, an end in an axial direction of the screw rotor (40) serving as a suction side for a fluid and the other end in the axial direction of the screw rotor (40) serving as a discharge side; a gate rotor (50)

including a plurality of gates (51) which are engaged with the helical groove (41) and arranged radially; a drive mechanism (15) configured to rotate the screw rotor (40); a cylinder (31) configured to accommodate the screw rotor (40) such that a compression chamber (23) enclosing a fluid is defined in the helical groove (41); a discharge port (25) through which the fluid in the compression chamber (23) flows toward the discharge side of the screw rotor (40); and an adjustment mechanism (3) configured to adjust a compression ratio of the compression chamber (23) within a predetermined range, wherein the adjustment mechanism (3) adjusts the compression ratio of the compression chamber (23) to a minimum compression ratio immediately before, or when, operation of the screw rotor (40) is stopped.

In the single-screw compressor of the first aspect, when the drive mechanism (15) rotates the screw rotor (40), a fluid is sucked into the helical groove (41). As the volume of the compression chamber (23) in the helical groove (41) decreases with the rotation of the screw rotor (40), a fluid in the compression chamber (23) is compressed. When the screw rotor (40) further rotates so that the compression chamber (23) and the discharge port (25) communicate with each other, the fluid in the compression chamber (23) is discharged to outside the compression chamber (23) through the discharge port (25).

The single-screw compressor of this aspect includes the adjustment mechanism (3) configured to adjust a compression ratio, i.e., a ratio of a suction volume Vs to a discharge volume Vd (a volume ratio: VI (=Vs/Vd)), of the compression chamber (23). As a result, in the single-screw compressor of this aspect, the compression ratio of the compression chamber (23) can be adjusted within a predetermined range according to the operating conditions and applications.

In this aspect, the adjustment mechanism (3) adjusts the compression ratio to the minimum compression ratio immediately before, or when, operation of the screw rotor (40) is stopped. That is, the compression ratio of the compression chamber (23) of this aspect can be adjusted by the adjustment mechanism (3) within a range from a predetermined minimum compression ratio to a predetermined maximum compression ratio. At the time when operation of the single-screw compressor is stopped, the compression ratio is at the minimum compression ratio in this range. Accordingly, the above-described reverse differential pressure phenomenon can be avoided immediately after stop of the single-screw compressor.

Specifically, adjustment of the compression ratio to the minimum compression ratio when operation of the single-screw compressor is stopped can reduce the degree of expansion and pressure reduction (i.e., an expansion ratio) of a fluid in the helical groove (41) even when the screw rotor (40) rotates reversely due to a level differential pressure to cause the fluid to flow back in the helical groove (41). That is, the expansion ratio of a fluid in reverse rotation of the screw rotor (40) is determined by the compression ratio in normal operation. As the compression ratio increases, the expansion ratio in reverse rotation increases. On the other hand, in the present disclosure, since the compression ratio is adjusted to the minimum compression ratio when the single-screw compressor is stopped, a fluid is subjected to pressure reduction only at the minimum expansion ratio even with reverse rotation of the screw rotor (40). Consequently, it is possible to avoid a reverse differential pressure phenomenon in which the pressure of a fluid in the helical groove is disadvantageously lower than the pressure of a fluid in the suction side of the screw rotor (40) immediately after stop of operation of the single-screw compressor.

In a second aspect of the present disclosure, the single-screw compressor of the first aspect further includes: a reverse rotation reduction mechanism (15, 82) configured to reduce reverse rotation of the screw rotor (40) when operation of the screw rotor (40) is stopped.

In the second aspect, the reverse rotation reduction mechanism (15, 82) reduces reverse rotation of the screw rotor (40) when operation of the screw rotor (40) is stopped. Consequently, it is possible to reduce backflow of a fluid from a discharge side to the suction side of the screw rotor (40), and also reduce occurrence of the reverse differential pressure phenomenon.

In a third aspect of the present disclosure, the single-screw compressor of the second aspect further includes: a casing (30) including a discharge chamber (S2) to which a fluid flows from the discharge port (25); and a discharge pipe (26) connected to the casing (30) such that the discharge pipe (26) communicates with the discharge chamber (S2), wherein the reverse rotation reduction mechanism (15, 82) is a backflow resistance part (82) configured to provide resistance to a fluid flowing from the discharge chamber (S2) to the discharge port (25).

The single-screw compressor of the third aspect includes the backflow resistance part (82) as the reverse rotation reduction mechanism. When operation of the screw rotor (40) is stopped, the backflow resistance part (82) provides resistance to a fluid flowing from the discharge pipe (26) to the discharge chamber (S2). Accordingly, backflow of the fluid immediately after stop of the single-screw compressor can be reduced, and further, reverse rotation of the screw rotor (40) can also be reduced.

In a fourth aspect of the present disclosure, in the single-screw compressor of the second aspect, the reverse rotation reduction mechanism (15, 82) is a motor (15) with regenerative braking serving as the drive mechanism and configured to provide resistance to reverse rotation of the screw rotor (40).

In the fourth aspect, the motor (15) with regenerative braking as a drive mechanism constitute the reverse rotation reduction mechanism. Specifically when a fluid flows back to cause reverse rotation of the screw rotor (40) immediately after stop of the single-screw compressor, the motor (15) with regenerative braking provides braking (rotational resistance) to this reverse rotation. Accordingly, in the motor (15) with regenerative braking, kinetic energy of the screw rotor (40) can be collected as electric energy.

In a fifth aspect of the present disclosure, in the single-screw compressor of any one of the first through fourth aspects, the adjustment mechanism (3) includes: a slide groove (33) formed in an inner wall of the cylinder (31) along an axis of the cylinder (31); a slide valve (4) configured to slidably fits in the slide groove (33) to change a location at which the compression chamber (23) and the discharge port (25) communicate with each other; and a displacement part (10b, 31a) configured to displace the slide valve (4) such that the slide valve (4) is at a first position closest to the suction side of the screw rotor (40) immediately before, or when, operation of the screw rotor (40) is stopped.

The adjustment mechanism (3) of the fifth aspect includes the slide groove (33), the slide valve (4), and the displacement part (10b, 31a). When the slide valve (4) is displaced in the axial direction in the slide groove (33), the location at which the compression chamber (23) and the discharge port (25) communicate with each other is changed. Specifically, when the slide valve (4) approaches the suction side of the screw rotor (40), the timing of communication between the compression chamber (23) and the discharge port (25) becomes earlier. Consequently, the compression ratio of the compression chamber (23) becomes relatively low. On the other hand, when the slide valve (4) moves away from the suction side of the screw rotor (40), the timing of communication between the compression chamber (23) and the discharge port (25) becomes later. Consequently, the compression ratio of the compression chamber (23) becomes relatively high. In the manner described above, in the adjustment mechanism (3) of this aspect, adjustment of the position of the slide valve (4) can adjust the timing of communication between the compression chamber (23) and the discharge port (25), and further adjust the compression ratio of the compression chamber (23) within a predetermined range.

In this aspect, immediately before, or when, operation of the screw rotor (40) is stopped, the displacement part (10b, 31a) adjusts the slide valve (4) to the first position (i.e., the position closest to the suction side of the screw rotor). Consequently, at the time when the single-screw compressor is stopped, the compression ratio is at the minimum compression ratio, thereby ensuring avoidance of the reverse differential pressure phenomenon.

In a sixth aspect of the present disclosure, in the single-screw compressor of the fifth aspect, the adjustment mechanism (3) is configured such that when the slide valve (4) is at the first position, a space (S1) at the suction side of the screw rotor (40) and the discharge port (25) communicate with each other through the helical groove (41).

In the sixth aspect, in the state where the slide valve (4) is at the first position when the single-screw compressor is stopped, the discharge port (25) at the discharge side of the screw rotor (40) and the suction side of the screw rotor (40) directly communicate with each other through the helical groove (41). Accordingly, even when a fluid in the discharge side of the screw rotor (40) flows back into the inside of the helical groove (41) when the single-screw compressor is stopped, the fluid in the helical groove (41) does not expand, and flows out into the suction side of the screw rotor (40). That is, in this aspect, even with reverse rotation of the screw rotor (40), the expansion ratio of the fluid is substantially 1.0, thus further ensuring avoidance of the reverse differential pressure phenomenon.

Advantages of the Invention

According to the present disclosure, immediately before, or when, the screw rotor (40) stops, the compression ratio is set at the minimum compression ratio. Accordingly, in stopping the single-screw compressor, it is possible to reduce a reverse differential pressure phenomenon in which the pressure in the helical groove (41) is lower than the pressure in the suction side of the screw rotor (40). This reduction of the reverse differential pressure phenomenon can reduce pushing of the gates (51) of the gate rotor (50) in the direction opposite to that in normal operation during reverse rotation of the screw rotor (40). In this manner, it is possible to reduce problems such as removal of the resin gates (51) from the arm (57) of the gate rotor (50) and accelerated abrasion of sealing parts of the gates (51) of the gate rotor (50). As a result, durability of the gate rotor (50) can be improved.

In particular, in the second aspect, reverse rotation of the screw rotor (40) is reduced by the reverse rotation reduction mechanism (15, 82). Thus, a reverse differential pressure phenomenon due to reverse rotation of the screw rotor (40) can be avoided. In addition, in this aspect, even if a reverse differential pressure phenomenon occurs, the speed of reverse rotation of the screw rotor (40) can be reduced. As a result, it is possible to reduce the above problems such as removal of the gates (51) from the arm and abrasion of the gates (51).

In the third aspect, the backflow resistance part (82) provides resistance to a flow of a fluid from the discharge chamber (S2) to the discharge port (25). Accordingly, reverse rotation of the screw rotor (40) can be reduced with a relatively simple configuration.

In the fourth aspect, the drive mechanism is constituted by the motor (15) with regenerative braking. Accordingly, it is possible to collect kinetic energy of the screw rotor (40) under reverse rotation (i.e., kinetic energy of a backflow fluid), while reducing the reverse rotation of the screw rotor (40). As a result, energy saving in this single-screw compressor can be enhanced.

In the fifth aspect, the slide valve (4) is set at the first position immediately before, or when, the screw rotor (40) is stopped. Consequently, it is possible to ensure that the compression ratio immediately after stop of the single-screw compressor is at the minimum compression ratio to achieve the above-described advantages.

In particular, in the sixth aspect, the discharge side and the suction side of the screw rotor (40) directly communicate with each other through the helical groove (41) by setting the slide valve (4) at the first position. Accordingly, it is possible to ensure reduction of expansion, and further pressure reduction, of a fluid in the helical groove (41) even when reverse rotation of the screw rotor (40) occurs to cause backflow of the fluid. As a result, it is possible to avoidance of the reverse differential pressure phenomenon, thereby effectively improving durability of the screw rotor (40).

BRIEF DESCRIPTION OF THE DRAWINGS

FIG. 6(A) illustrates a suction stroke, FIG. 6(B) illustrates a compression stroke, and FIG. 6(C) illustrates a discharge stroke.

FIG. 11(A) is a vertical cross-sectional view, and FIG. 11(B) is a rear view.

FIG. 14(A) is a vertical cross-sectional view, and FIG. 14(B) is a rear view.

DESCRIPTION OF EMBODIMENTS

Figure 1:
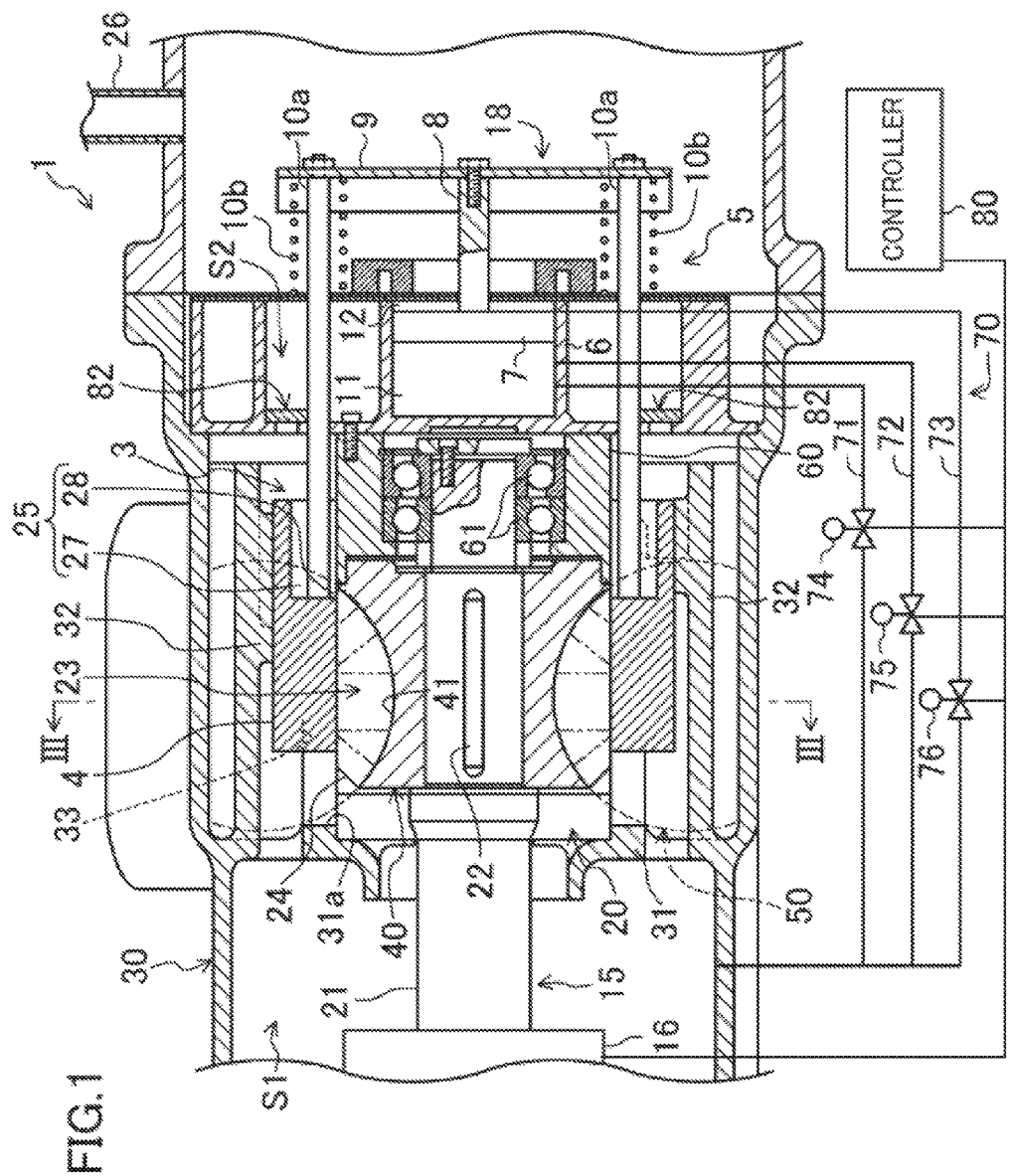
FIG. 1 is a vertical cross-sectional view illustrating a configuration of a main part of a screw compressor according to an embodiment of the present disclosure in a maximum VI operating state associated with a rated load.

An embodiment of the present disclosure will be described hereinafter with reference to the drawings, A single-screw compressor (1) (hereinafter referred to simply as a screw compressor) according to an embodiment of the present disclosure is applicable to a chilling unit for air conditioning of rooms of, for example, a relatively large building. This chilling unit constitutes a refrigeration system which circulates refrigerant of a refrigeration circuit to perform a refrigeration cycle of a vapor compression type. The screw compressor (1) is connected to this refrigeration circuit.

The screw compressor (1) includes: a compression mechanism (20); a drive mechanism (15) configured to drive the compression mechanism (20); and a variable VI mechanism (3) configured to adjust a volume ratio VI of the compression mechanism (20).

The screw compressor (1) also includes a casing (30) configured to accommodate the compression mechanism (20) and the drive mechanism (15).

Figure 2:
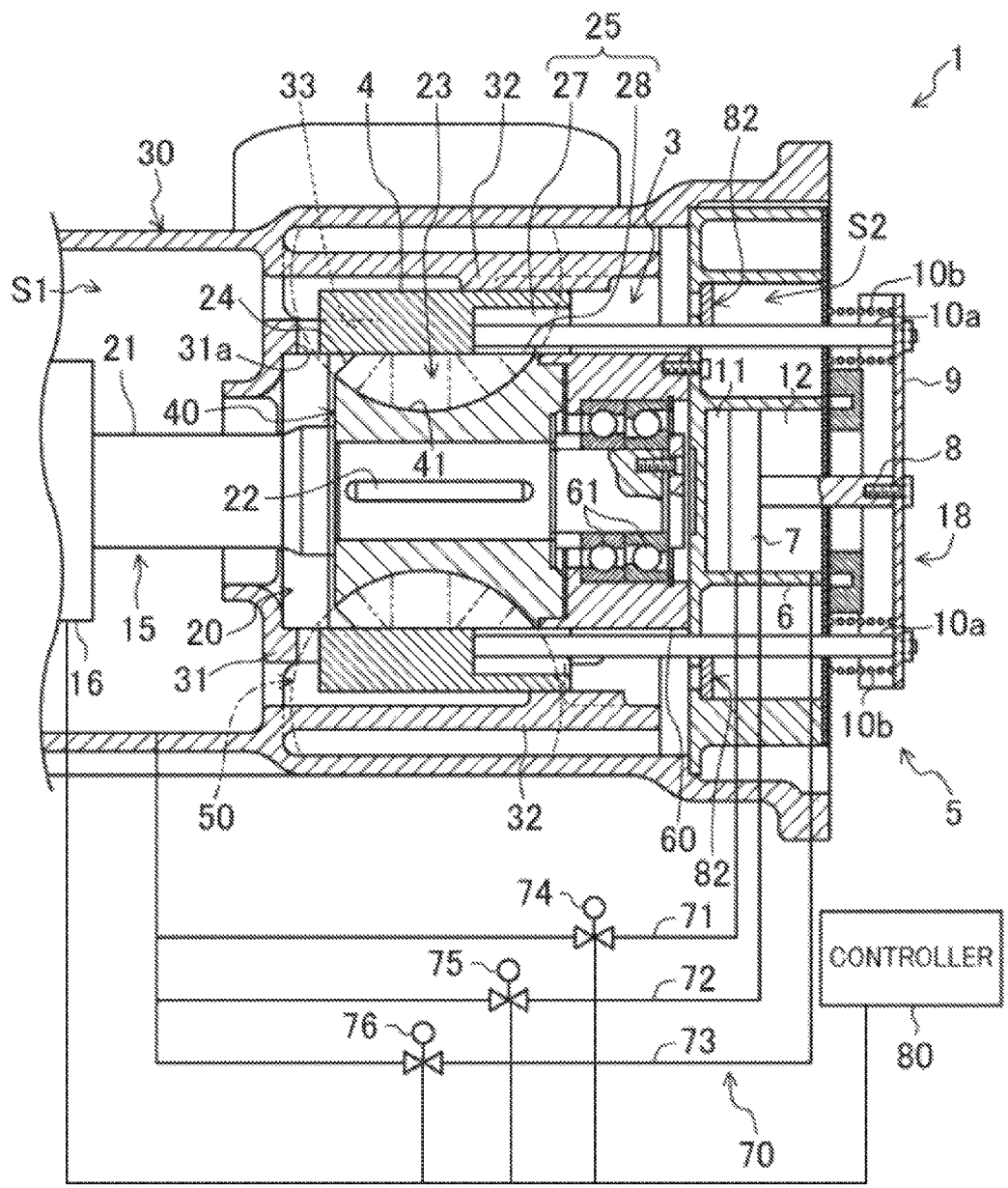
FIG. 2 is a vertical cross-sectional view illustrating the main part of the screw compressor illustrated in FIG. 1 in a low VI operating state associated with a partial load.
Figure 3:
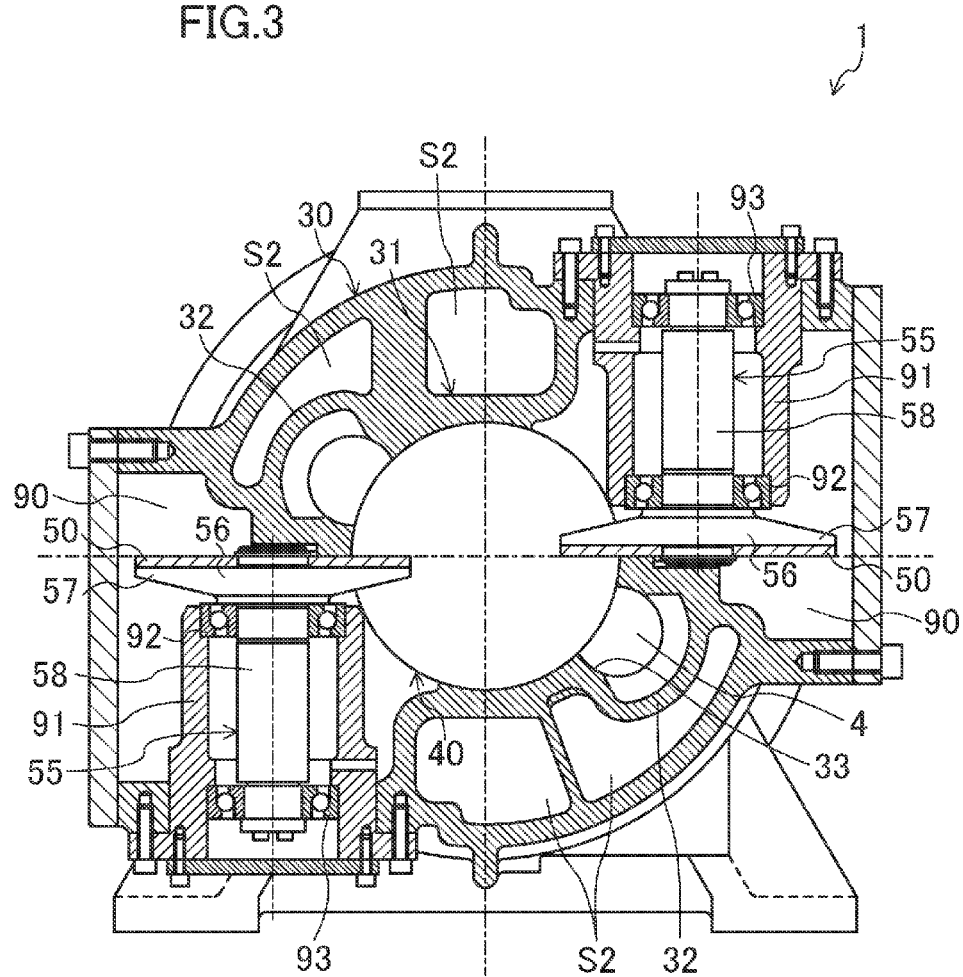
FIG. 3 is a horizontal cross-sectional view taken along line in FIG.

As illustrated in FIGS. 1-3, the compression mechanism (20) includes: a cylinder wall (31) formed in the casing (30); a screw rotor (40) rotatably provided in the cylinder wall (31); and two gate rotors (50) engaged with the screw rotor (40).

In the casing (30), a suction chamber (S1) facing a suction port (24) of the compression mechanism (20) and a discharge chamber (S2) facing a discharge port (25) of the compression mechanism (20) are defined. A discharge pipe (26) is connected to the casing (30) to communicate with the discharge chamber (S2). The discharge pipe (26) is a pipe for sending refrigerant in the discharge chamber (S2) to the outside the casing (30) (i.e., a high-pressure line of the refrigeration circuit).

Communication parts (32) each of which radially outwardly bulges and allows the suction chamber (S1) and the discharge chamber (S2) to communicate with each other are provided at two locations on the circumference of the cylinder wall (31). Each of the communication parts (32) includes a slide groove (33) extending along the axis of the cylinder wall (31). The slide groove (33) is equipped with a slide valve (4), which will be described later, such that the slide valve (4) is movable along the axis. The discharge port (25) includes a valve-side discharge port (27) provided in the slide valve (4) and a cylinder-side discharge port (28) provided in the cylinder wall (31).

The drive mechanism (15) includes a driving shaft (21) which is inserted in the screw rotor (40) and an electric motor (16) configured to rotate the driving shaft (21). The screw rotor (40) and the driving shaft (21) are coupled together by a key (22). In this manner, the screw rotor (40) is rotated by the drive mechanism (15).

The driving shaft (21) is disposed on the same axis with the screw rotor (40). The tip portion of the driving shaft (21) is rotatably supported by a bearing holder (60) located on the discharge side (i.e., on the right side in FIG. 1 where the axial direction of the driving shaft (21) is taken as the left-right direction) of the compression mechanism (20). The bearing holder (60) supports the driving shaft (21) via a ball bearing (61). The screw rotor (40) rotatably fits in the cylinder wall (31), and the outer periphery of the screw rotor (40) is in slidable contact with the inner periphery via an oil film.

The electric motor (16) is configured to have its rotation speed adjusted by inverter control. Thus, the screw compressor (1) can change operation capacity by adjusting the rotation speed of the electric motor (16). The operation capacity (a discharge rate of refrigerant discharged from the compression mechanism (20) per a unit time) of the screw compressor (1) is controlled according to a load on the utilization side of the refrigeration circuit. Here, the slide valve (4) of the variable VI mechanism (3) is controlled to have a volume ratio (a compression ratio) which can lead to an optimum compression efficiency with respect to the operation capacity controlled according to the load on the utilization side. Specifically, the position of the slide valve (4) changes along the axis of the screw rotor (40) according to the operation capacity which changes depending on whether the operating state is in a rated load (100% load) state or a partial load state. In the screw compressor (1), the position of the slide valve (4) changes to the left (i.e., to the suction side) in FIG. 1 such that the area of the cylinder-side discharge port (28) is larger in an operating state with a smaller load when the operating state (i.e., the state illustrated in FIG. 1) with a rated load and the operating state (i.e., the state illustrated in FIG. 2) with a partial load are compared with each other.

Figure 4:
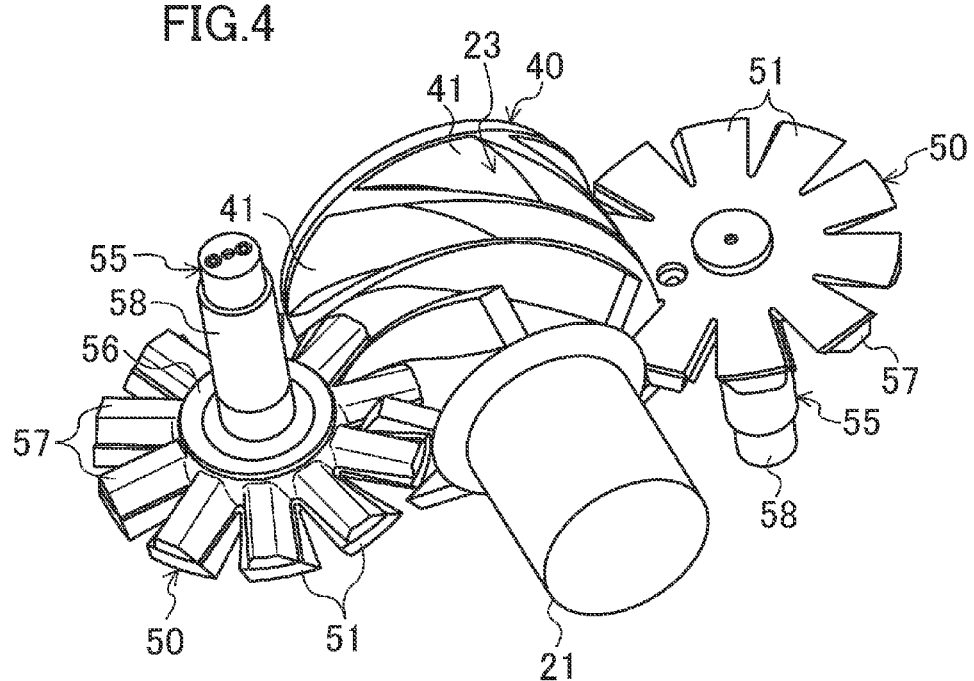
FIG. 4 is a perspective view illustrating a main part of the screw compressor.
Figure 5:
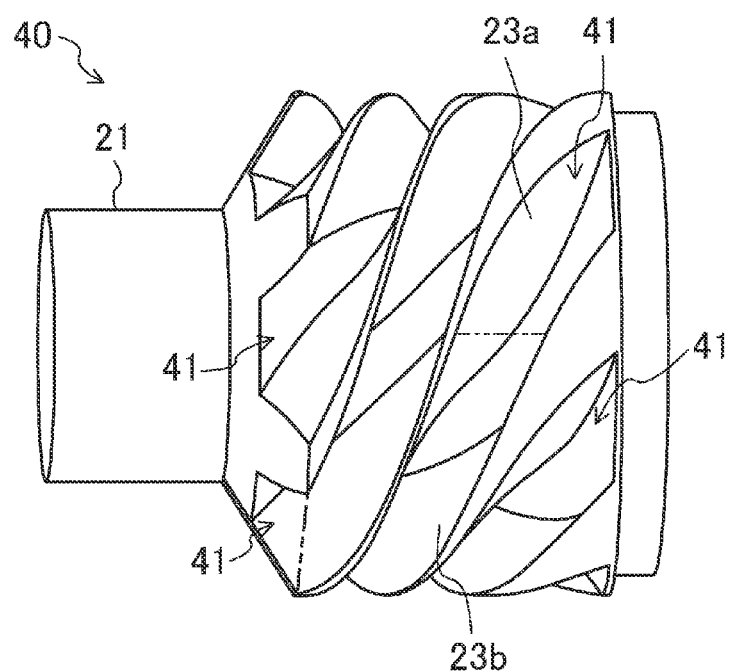
FIG. 5 is a perspective view illustrated in a screw rotor of the screw compressor.

The screw rotor (40) illustrated in FIGS. 4 and 5 is an approximately cylindrical metal member. A plurality of (six in this embodiment) helical grooves (41) are formed in the outer periphery of the screw rotor (40) so as to extend in a helical pattern from one end (an end at the suction side of a fluid (refrigerant)) to the other end (an end at the discharge side) of the screw rotor (40).

Each of the helical grooves (41) of the screw rotor (40) has a start end at the left end in FIG. 5 (the end at the suction side) and a terminal end at the right end in FIG. 5 (the end at the discharge side of the fluid). The left end portion in FIG. 5 of the screw rotor (40) is tapered. In the screw rotor (40) illustrated in 5, the start end of each of the helical grooves (41) is open at the left end of the tapered portion, whereas the terminal end is not open at the right end thereof. Each of the helical grooves (41) of the screw rotor (40) is open to the suction chamber (S1) at the suction-side end, and this opening serves as a suction port (24) of the compression mechanism (20).

The gate rotors (50) are resin members. Each of the gate rotors (50) includes a plurality of (eleven in this embodiment) gates (51) which are radially arranged rectangle plates. The gate rotors (50) are arranged outside the cylinder wall (31) to be axially symmetrical with each other about the rotation axis of the screw rotor (40). In the screw compressor (1) of this embodiment, two gate rotors (50) are disposed equi-angularly (spaced from each other by 180° in this embodiment) about the rotation center axis of the screw rotor (40). The axis of each of the gate rotors (50) is perpendicular to the axis of the screw rotor (40). The gate rotors (50) are arranged such that the gates (51) penetrate portions (not shown) of the cylinder wall (31) to be engaged with the helical grooves (41) of the screw rotor (40).

Each of the gate rotors (50) is attached to a metal rotor supporting member (55) (see FIG. 4). The rotor supporting member (55) includes a base (56), arms (57), and a shaft (58). The base (56) has a relatively thick disc shape. The number of arms (57) is the same as that of the gates (51) of each of the gate rotors (50). The arms (57) extend radially outwardly from the outer periphery of the base (56). The shaft (58) is formed in a round rod shape, and is provided so as to stand on the base (56). The center axis of the shaft (58) coincides with the center axis of the base (56). Each of the gate rotors (50) is attached to the surfaces of the base (56) and the arms (57) opposite to the shaft (58). The arms (57) are in contact with the back surfaces of the gates (51).

The rotor supporting members (55) to which the gate rotors (50) are attached are housed in gate rotor chambers (90) each of which is adjacent to the cylinder wall (31) defined in the casing (30) (see FIG. 3). The gate rotor chamber (90) communicates with the suction chamber (S1), and is in a low-pressure atmosphere. That is, the pressure of refrigerant in the suction side of the screw rotor (40) acts on the gate rotors (50).

The rotor supporting member (55) at the right of the screw rotor (40) in FIG. 3 is oriented such that the gate rotor (50) is located at the bottom of the rotor supporting member (55). On the other hand, the rotor supporting member (55) at the left of the screw rotor (40) in FIG. 3 is oriented such that the gate rotor (50) is located at the top of the rotor supporting member (55). The shaft (58) of each of the rotor supporting members (55) is rotatably supported by a bearing housing (91) in the gate rotor chamber (90) via the ball bearing (92, 93).

In the compression mechanism (20), the space surrounded by the inner peripheral surface of the cylinder wall (31), the helical grooves (41) in the screw rotor (40), and the gates (51) of the gate rotors (50) serves as the compression chamber (23). The compression chamber (23) is constituted by a first compression chamber (23a) located above the horizontal center line in FIG. 3 and a second compression chamber (23b) located below the center line (see FIG. 5).

As described above, the screw compressor (1) includes the variable VI mechanism (an adjustment mechanism) (3) configured to adjust the volume ratio VI of the compression mechanism (20). The volume ratio VI refers to the ratio (Vs/Vd) of the suction volume Vs to the discharge volume Vd in the compression mechanism (20), i.e., the compression ratio of the compression mechanism (20).

The variable VI mechanism (3) includes the slide groove (33) and the slide valve (4) as described above, and also includes a valve displacement mechanism (18) configured to change the location of the slide valve (4) in the slide groove (33). The valve displacement mechanism (18) includes a hydraulic cylinder (5) and a pressure adjustment mechanism (70) (see FIGS. 1 and 2).

The slide valve (4) is provided in each of the compression chambers (23a, 23b) such that the two slide valves (4) are associated with the first compression chamber (23a) and the second compression chamber (23b), respectively. The slide valve (4) slidably fits in the slide groove (33). The slide valve (4) is configured to be movable, the slide groove (33), between a position (a first position) closest to the suction side, i.e., the suction port (24), of the screw rotor (40) and a position (a second position) farthest from the suction port (24). When the slide valve (4) is at the first position, the inner wall of one side along the axial direction (i.e., the suction side), of the slide groove (33) is in contact with an end along the axial direction, of the slide valve (4). That is, in the cylinder wall (31), a contact part (31a) configured to come into contact with the slide valve (4) is formed to hold the slide valve (4) at the first position.

The other end along the axial direction of the slide valve (4) has a slope (4a) relative to the axial direction (see FIG. 7(A)). This slope (4a) is formed such that the opening width of the discharge port (25) increases in the rotational direction (i.e., the direction indicated by the arrow in FIG. 7(A)) of the screw rotor (40).

Figure 7:
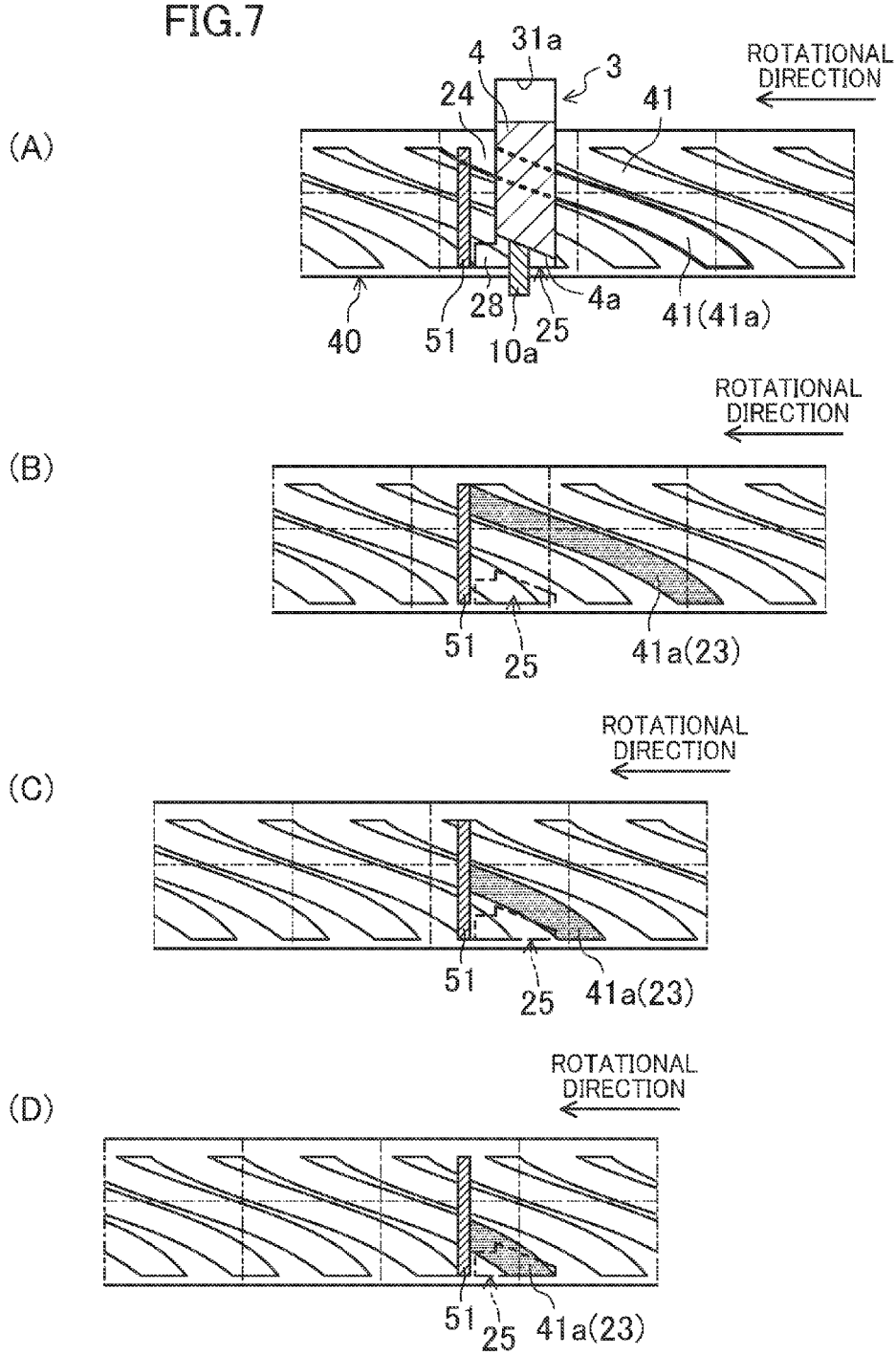
FIG. 7 shows developed views illustrating operation of the compression mechanism in a maximum VI operating state, and the screw rotor rotates in the normal direction in the order of FIGS. 7(A), 7(B), 7(C), and 7(D).
Figure 8:
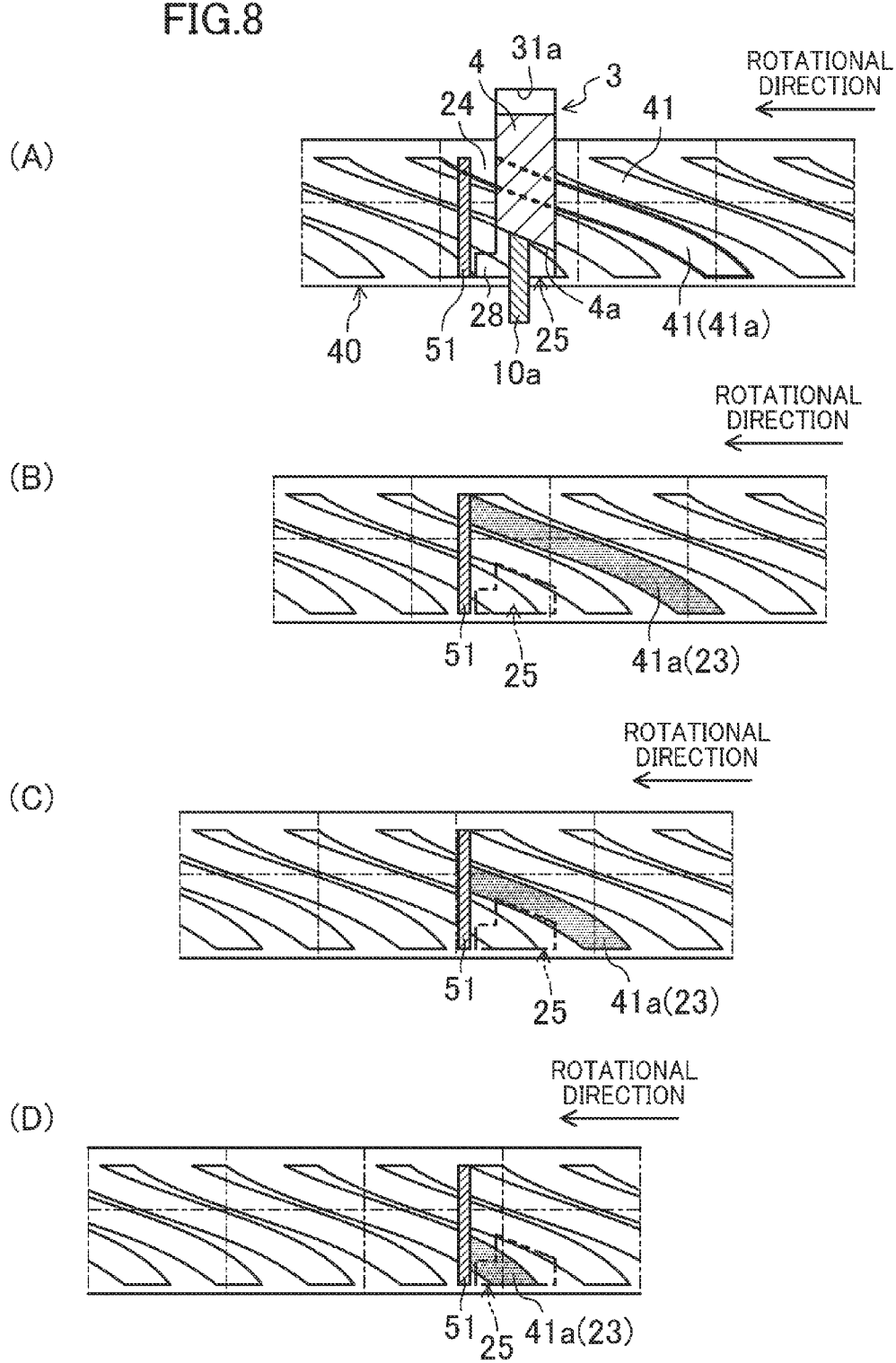
FIG. 8 shows developed views illustrating operation of the compression mechanism in an intermediate VI operating state, and the screw rotor rotates in the normal direction in the order of FIGS. 8(A), 8(B), 8(C), and 8(D).
Figure 10:
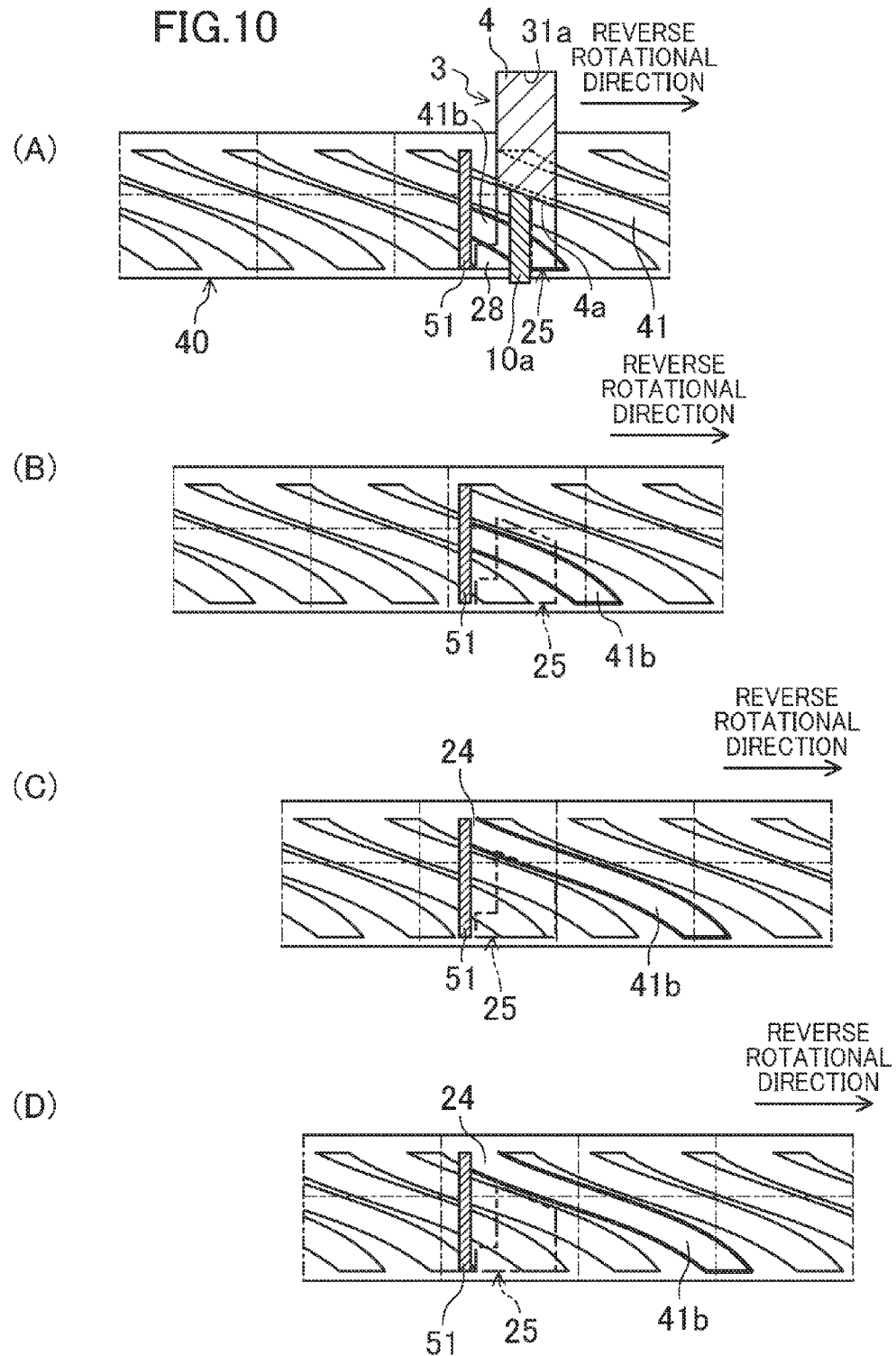
FIG. 10 shows developed views illustrating the compression mechanism while the screw compressor is stopped, and the screw rotor rotates in the reverse direction in the order of FIGS. 10(A), 10(9), 10(C), and 10(D).

In the compression mechanism (20), the area of the opening of the discharge port (25) changes according to the position of the slide valve (4) (see FIGS. 7, 8 and 10). In this manner, the location at which the compression chamber (23a, 23b) communicates with the discharge port (25) changes. Consequently, the timing of a discharge stroke in which refrigerant is discharged from the compression chamber (23a, 23b) is adjusted, thereby adjusting the volume ratio VI. The shape of the opening of the cylinder-side discharge port (28) described above is defined based on the state in which the slide valve (4) is at the second position. Specifically, irrespective of where the slide valve (4) is located between the first position and the second position, the cylinder-side discharge port (28) is not blocked by the slide valve (4) but is open, thereby allowing refrigerant to be discharged.

When the slide valve (4) is at the second position shown in FIG. 7, the compression chamber (23a, 23b) communicates with the discharge port (25) at the position farthest from the suction port (24) (i.e., the position closest to the discharge chamber (S2)). Accordingly, the timing of stat of the discharge stroke of the compression chamber (23a, 23b) (i.e., the timing of end of a compression stroke) is the latest, resulting in that the volume ratio VI becomes the maximum volume ratio VImax (i.e., the highest compression ratio). On the other hand, when the slide valve (4) is at the first position shown in FIG. 10, the compression chamber (23a, 23b) communicates with the discharge port (25) at the position farthest from the suction port (24). Accordingly, the timing of start of the discharge stroke of the compression chamber (23a, 23b) (i.e., the timing of end of the compression stroke) is the earliest, resulting in that the volume ratio VI becomes the minimum volume ratio VImin (i.e., the lowest compression ratio).

The hydraulic cylinder (5) includes a cylinder tube (6), a piston (7) loaded in the cylinder tube (6), an arm (9) coupled to a piston rod (8) of the piston (7), a coupling rod (10a) coupling the arm (9) and the slide valve (4) together, and a spring (10b) for urging the arm (9) to the left in FIG. 1 (in such a direction that the arm (9) is pulled toward the casing (30)). The spring (10b) constitutes an urging mechanism for urging the slide valve (4) to the suction side of the screw rotor (40).

Two cylinder chambers (11, 12) defined by the piston (7) are formed in the cylinder tube (6). Specifically, a first cylinder chamber (11) is formed at an end along the axial direction of the piston (7) (i.e., at the left of the piston (7) in FIG. 1), and a second cylinder chamber (12) is formed at the other end along the axial direction of the piston (7) (i.e., at the right of the piston (7) in FIG. 1). The internal pressures of these cylinder chambers (11, 12) are basically substantially equal to that of high-pressure refrigerant (discharge refrigerant).

The pressure adjustment mechanism (70) displaces the slide valve (4) by utilizing the difference between the pressure of refrigerant in the suction side of the compression chamber (23) and the pressure of refrigerant in the discharge side of the compression chamber (23). The pressure adjustment mechanism (70) includes first through third communication pipes (71, 72, 73) and first through third shut-off valves (74, 75, 76) respectively associated with the communication pipes (71, 72, 73). Each of the communication pipes (71, 72, 73) has an end connected to the second cylinder chamber (12) and the other end communicating with the suction chamber (S1). In the second cylinder chamber (12), a connection port of the first communication pipe (71) is located closer to the piston (7) than a connection port of the second communication pipe (72). In the second cylinder chamber (12), the connection port of the second communication pipe (72) is located closer to the piston (7) than a connection port of the third communication pipe (73). Each of the shut-off valves (74, 75, 76) is a solenoid valve for opening/closing the associated one of the communication pipes (71, 72, 73). The screw compressor (1) includes a controller (a control unit) (80) for controlling the opening/closing state of each of the shut-off valves (74, 75, 76) and the operating state of the electric motor (16) (i.e., the ON/OFF state and the operation frequency of the electric motor (16)) (see FIGS. 1 and 2).

The screw compressor (1) of this embodiment is configured to appropriately change the volume ratio VI in steady operation in which the revolution speed of the screw rotor (40) reaches a predetermined revolution speed. Specifically, in the steady operation of the screw compressor (1), the operation capacity of the compression mechanism (20) is changed according to the load at the utilization side of the refrigeration circuit, and the volume ratio VI is changed according to this change of the operation capacity.

More specifically, in a case where the load at the utilization side is a rated load (a 100% load), the revolution speed of the driving shaft (21) is relatively high, and the operation capacity is relatively large accordingly. In this case, the position of the slide valve (4) is adjusted such that the volume ratio VI is the maximum volume ratio VImax (e.g., VImax=3.0). In a case where the load at the utilization side is a partial load, the revolution speed of the driving shaft (21) is relatively low, and the operation capacity is relatively small accordingly. In this case, the position of the slide valve (4) is adjusted such that the volume ratio VI is a predetermined volume ratio (e.g., an intermediate volume ratio VImid of 1.5) smaller than the maximum volume ratio VImax. As described above, in the steady operation of the screw compressor (1), the volume ratio VI of the compression mechanism (20) is adjusted within a predetermined control range (e.g., in the range of VI=1.5-3.0).

In the screw compressor (1) of this embodiment, in stopping operation of the screw rotor (40) under operation (i.e., in stopping operation of the screw compressor (1)), the volume ratio VI is adjusted to the minimum volume ratio. Specifically, in this embodiment, immediately before the screw rotor (40) stops, the slide valve (4) urged by the spring (10b) is in contact with the contact part (31a) and held at the first position. Consequently, at a subsequent time when the screw rotor (40) stops, the volume ratio VI becomes the minimum volume ratio VImin. As described above, in this embodiment, immediately before the screw rotor (40) stops, the spring (10b) and the contact part (31a) constitute a displacement part for displacing the slide valve (4) to the first position.

The optimum volume ratio VImin of this embodiment is lower than the control range of the volume ratio VI (i.e., the range of VI=1.5-3.0) in the steady operation. In addition, in this embodiment, the optimum volume ratio VImin is set at 1.0.

The screw compressor (1) of this embodiment includes a backflow resistance valve (82) at the discharge side of the screw rotor (40) (see, for example, FIG. 1). The backflow resistance valve (82) is disposed in a path between the discharge port (25) and the discharge pipe (26). The backflow resistance valve (82) constitutes a backflow resistance part for providing resistance to refrigerant flowing from the discharge chamber (S2) to the discharge port (25) when the screw rotor (40) rotates reversely immediately after stop of the screw compressor (1) (which will be specifically described later).

Figure 11:
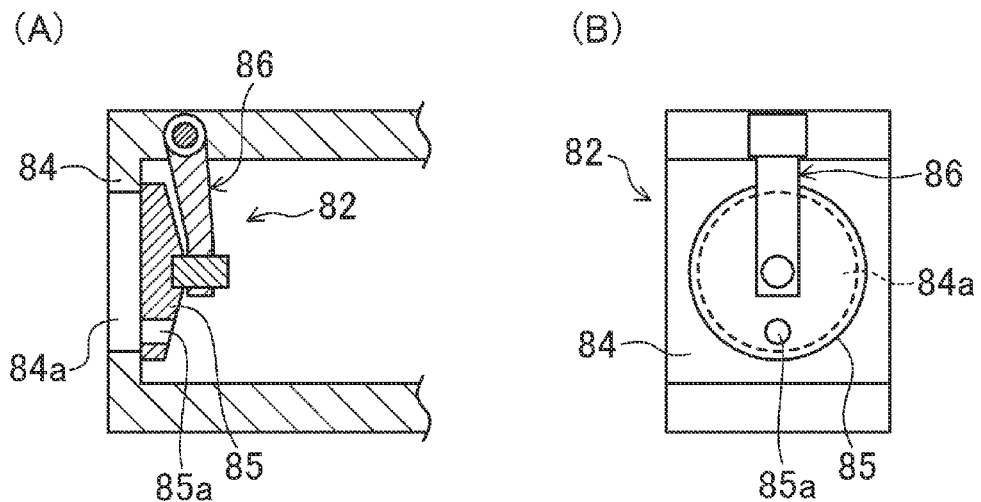
FIG. 11 schematically illustrates a configuration of a backflow resistance valve according to the embodiment.
Figure 12:
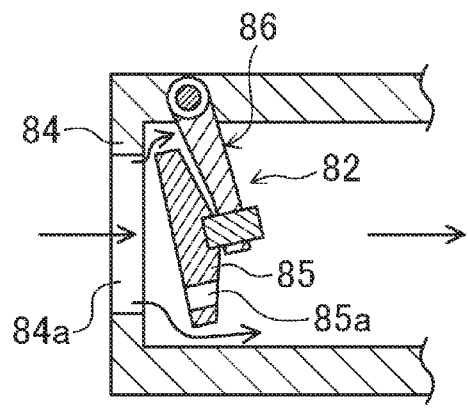
FIG. 12 is a vertical cross-sectional view illustrating the backflow resistance valve while the screw rotor rotates in the normal direction where a flow of a fluid is indicated by arrows.

Specifically, as illustrated in FIGS. 11 and 12, the backflow resistance valve (82) includes a valve seat (84) having a perfectly circular opening (84a), a valve element (85) for opening/closing the opening (84a) in the valve seat (84), and a valve element supporter (86) for rotatably supporting the valve element (85). The valve seat (84) is disposed across the refrigerant path connecting the discharge port (25) and the discharge pipe (26) together. The opening (84a) of the valve seat (84) faces the discharge port (25) at an end along the axial direction and also faces the space toward the discharge pipe (26) at the other end along the axial direction.

The valve element (85) is in the shape of a substantially circular disc to freely open and close the opening (84a) of the valve seat (84). The outer diameter of the valve element (85) is larger than the inner diameter of the opening (84a). The valve element (85) is located downstream of the valve seat (84) relative to the direction of a flow of refrigerant in normal operation (see FIG. 12). The valve element (85) has a substantially cylindrical communication hole (85a). The communication hole (85a) is formed along the axial direction through the valve element (85) at a position deviating radially outward from the axis of the valve element (85).

The valve element supporter (86) allows the valve element (85) to rotate such that the valve element (85) can freely open and close the opening (84a). In this manner, the valve element (85) can be displaced between the position (i.e., the position illustrated in 12) at which the valve element (85) opens the opening (84a) and the position (i.e., the position illustrated in FIG. 13) at which the valve element (85) closes the opening (84a), according to the flow direction of refrigerant. More specifically, in normal operation (i.e., operation in which the screw rotor (40) rotates forward), refrigerant flows in the direction shown in FIG. 12, but the valve element (85) is displaced to the position at which the valve element (85) opens the opening (84a) under the pressure of this refrigerant. On the other hand, when the screw rotor (40) rotates in the reverse direction immediately after stop of the normal operation, refrigerant flows back in the direction shown in FIG. 13, and the valve element (85) is displaced to the position at which the valve element (85) closes the opening (84a) under the pressure of this refrigerant.

When the opening (84a) is closed, the backflow refrigerant is sent toward the discharge port (25) through the communication hole (85a). In the manner described above, the backflow resistance valve (82) provides resistance to a fluid flowing from the discharge chamber (S2) to the discharge port (25), thereby reducing reverse rotation of the screw rotor (40). In other words, the backflow resistance valve (82) constitutes a reverse rotation reduction mechanism for reducing reverse rotation of the screw rotor (40) in stopping the screw compressor (1).

Operation

Operation of the screw compressor (1) will now be described.

<Basic Operation>

First, basic operation of the screw compressor (1) will be described with reference to FIG. 6.

Figure 6:
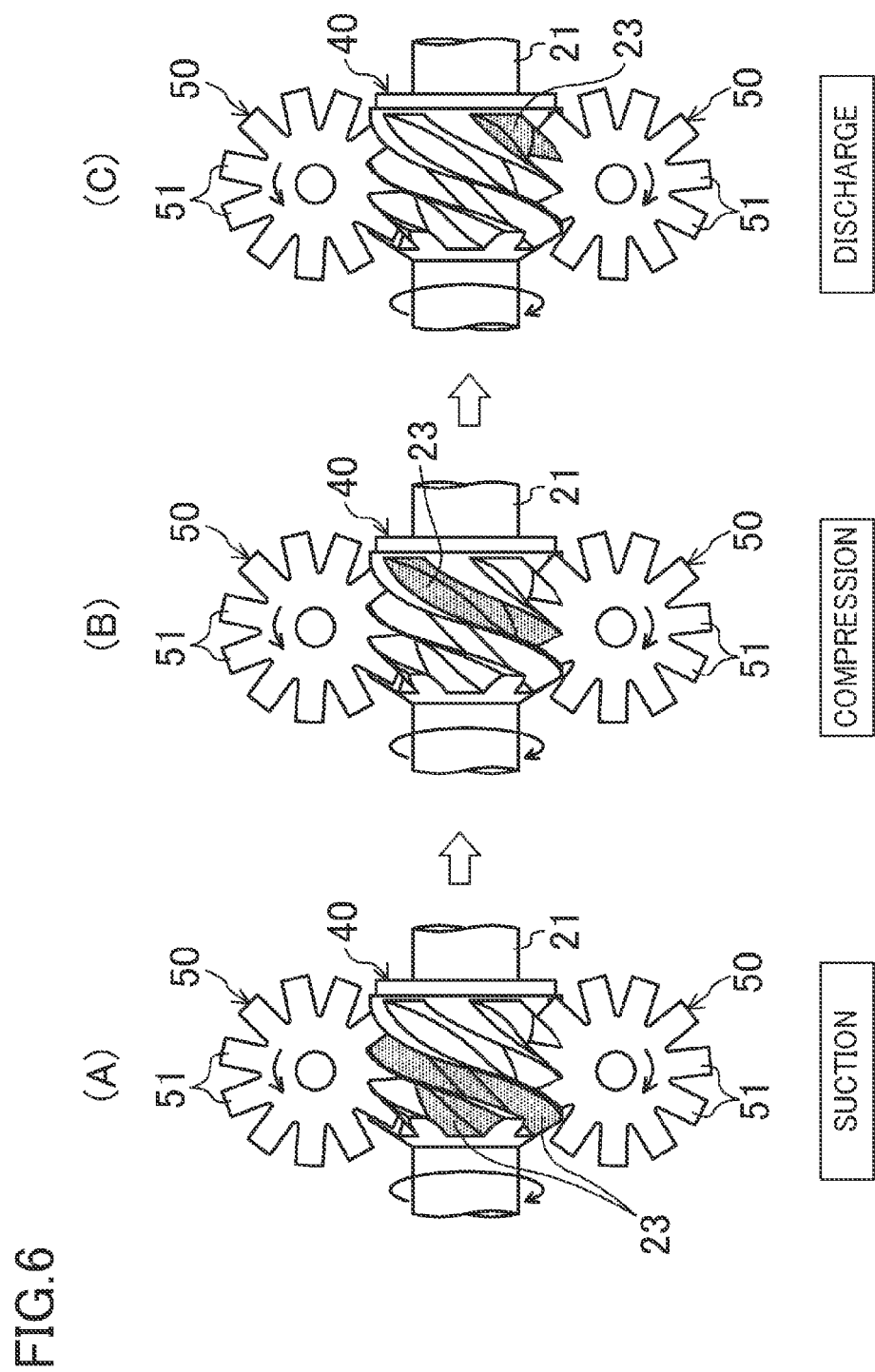
FIG. 6 shows top views illustrating operation of a compression mechanism of the screw compressor.

In the compression mechanism (20) of the screw compressor (1) under operation, the suction stroke illustrated in FIG. 6(A), the compression stroke illustrated in FIG. 6(B), and the discharge stroke illustrated in FIG. 6(C) are repeatedly performed in order. The following description will be focused on the compression chamber (23) indicated with dots in FIG. 6.

In FIG. 6(A), the compression chamber (23) indicated with dots communicates with the suction chamber (S1). The helical grooves (41) constituting the compression chamber (23) are engaged with the gates (51) of the lower gate rotor (50) in FIG. 6(A). When the screw rotor (40) rotates, the gates (51) move relatively toward the terminal ends of the helical grooves (41), and the volume of the compression chamber (23) increases accordingly. Consequently, low-pressure refrigerant in the suction chamber (S1) is sucked into the compression chamber (23) through the suction port (24).

When the screw rotor (40) further rotates, the state illustrated in FIG. 6(B) is established. In FIG. 6(B), the compression chamber (23) indicated with dots are closed. That is, the helical grooves (41) constituting the compression chamber (23) are engaged with the gates (51) of the upper gate rotor (50) in FIG. 6(B), and separated from the suction chamber (S1) by these gates (51). As the gates (51) move toward the terminal ends of the helical grooves (41) with rotation of the screw rotor (40), the volume of the compression chamber (23) gradually decreases. Consequently, a refrigerant gas in the compression chamber (23) is compressed.

When the screw rotor (40) further rotates, the state illustrated in FIG. 6(C) is established. In FIG. 6(C), the compression chamber (23) indicated with dots communicates with the discharge chamber (S2) through the discharge port (25). When the gates (51) move toward the terminal ends of the helical grooves (41) with rotation of the screw rotor (40), the compressed high-pressure refrigerant gas is pushed from the compression chamber (23) to the discharge chamber (S2) through the discharge port (25).

The high-pressure refrigerant gas which has flown into the discharge chamber (S2) passes through the backflow resistance valve (82). In normal operation of the screw compressor (1), the pressure of this high-pressure refrigerant gas acts on the tip surface (i.e., the left end surface in FIG. 12) of the valve element (85). Accordingly, as illustrated in FIG. 12, the valve element (85) is displaced to the position at which the valve element (85) opens the opening (84a) of the valve seat (84). In this manner, the high-pressure refrigerant gas passes through the opening (84a) and the periphery of the valve element (85) in this order. The refrigerant which has passed through the backflow resistance valve (82) flows out from the discharge pipe (26) to outside the casing (30) by way of a predetermined path (see FIG. 1). This refrigerant is sent to a high-pressure gas line of the refrigeration circuit, and used for a refrigeration cycle.

<Adjustment of Volume Ratio VI in Steady Operation>

Then, adjustment of the volume ratio VI in steady operation of the screw compressor (1) will be described. In the steady operation of the screw compressor (1), at least the maximum VI operation and the intermediate VI operation can be performed.

[Maximum VI Operation]

In a case where the load of the refrigeration system is a rated load, the volume ratio VI of the compression chamber (23) of the compression mechanism (20) is adjusted to the maximum volume ratio VImax (e.g., VImax=3.0). Specifically, if the load of the refrigeration system is a rated load, a controller (80) controls the operation frequency of the electric motor (16) to the maximum frequency, and the revolution speed of the driving shaft (21) becomes high. Consequently, the operation capacity of the compression mechanism (20) becomes the maximum capacity. In addition, the controller (80) makes the first shut-off valve (74) and the second shut-off valve (75) closed, while making a third shut-off valve (76) open.

When the third shut-off valve (76) is made open, the internal pressure of the second cylinder chamber (12) communicating with the suction chamber (S1) becomes lower than the internal pressure of the first cylinder chamber (11). Accordingly, the piston (7) is gradually displaced toward the second cylinder chamber (12) (i.e., toward the right in FIG. 1). As illustrated in FIG. 1, when this piston (7) is displaced to the position at which the piston (7) blocks the third communication pipe (73), the pressure of the second cylinder chamber (12) increases, and the piston (7) is displaced toward the first cylinder chamber (11) (i.e., toward the left in FIG. 1). Then, the opening end of the third communication pipe (73) is made open again, and the internal pressure of the second cylinder chamber (12) decreases again. Consequently, the piston (7) is displaced to the position at which the piston (7) blocks the opening end of the third communication pipe (73) again. In the manner described above, the piston (7) is held substantially near the opening end of the third communication pipe (73) (see FIG. 1). As a result, the slide valve (4) coupled to the piston (7) is held at the second position farthest from the suction port (24).

In a state in which the slide valve (4) is at the second position as illustrated in FIG. 7, the area of the opening of the discharge port (25) is at the minimum, and the timing of start of the discharge stroke (i.e., the timing of end of the compression stroke) is the latest. This will be specifically described, focusing on the helical grooves (41) (helical grooves (41a)) indicated by the bold line in FIG. 7(A). In FIGS. 7(B), 7(C), and 7(D), the slide valve (4) is not shown, whereas the discharge port (25) is indicated by the broken line. In FIGS. 7(B), 7(C), and 7(D), the compression chamber (23) formed in a helical groove (41a) under consideration is indicated with dots.

In the state illustrated in FIG. 7(A), the suction port (24) and the helical groove (41a) have not been separated from each other yet by a gate (51). On the other hand, the helical groove (41a) and the discharge port (25) are separated from each other by the slide valve (4). Accordingly, in the helical groove (41a) in the state illustrated in FIG. 7(A), the above-described suction stroke is performed.

When the screw rotor (40) in the state illustrated in FIG. 7(A) rotates and comes to be in the state illustrated in FIG. 7(B), the suction port (24) and the helical groove (41a) are separated from each other by the gate (51). The helical groove (41a) and the discharge port (25) are separated from each other by the slide valve (4). Accordingly, in the helical groove (41a) in the state illustrated in FIG. 7(B), the suction stroke finishes, and the above-described compression stroke starts.

When the screw rotor (40) in the state illustrated in FIG. 7(B) rotates, the volume of the compression chamber (23) in the helical groove (41a) gradually decreases. Accordingly, the compression stroke continues, thereby increasing the pressure of refrigerant in the compression chamber (23). Then, when the screw rotor (40) comes to be in the state illustrated in FIG. 7(C), the compression chamber (23) and the discharge port (25) communicate with each other. Consequently, the compression stroke finishes, and the above-described discharge stroke starts. As described above, in the operation with a rated load, the timing of communication between the compression chamber (23) and the discharge port (25) is the latest. Thus, the discharge capacity Vd is small, and the volume ratio VI is at the maximum volume ratio Vmax.

As illustrated in FIG. 7(D), when the screw rotor (40) further rotates, a high-pressure refrigerant gas flows out of the discharge port (5). This discharge stroke is performed until the communication between the compression chamber (23) in the helical groove (41a) and the discharge port (25)) is interrupted.

[Intermediate VI Operation]

In a case where the load of the refrigeration system is a partial load, the volume ratio VI of the compression chamber (23) of the compression mechanism (20) is adjusted to the intermediate volume ratio VImid (e.g., VImid=1.5). Specifically, if the load of the refrigeration system is a partial load, the controller (80) controls the operation frequency of the electric motor (16) to a predetermined frequency (a frequency lower than the above-mentioned maximum frequency), and the revolution speed of the driving shaft (21) becomes lower than that in the maximum VI operation described above. Consequently, the operation capacity of the compression mechanism (20) also becomes lower than the maximum VI operation. In addition, the controller (80) makes the second shut-off valve (75) open, while making the first and third shut-off valves (74, 76) closed.

When the second shut-off valve (75) is made open, the internal pressure of the second cylinder chamber (12) communicating with the suction chamber (S1) becomes lower than the internal pressure of the first cylinder chamber (11). Accordingly, the piston (7) is gradually displaced toward the second cylinder chamber (12) (i.e., toward the right in FIG. 2). As illustrated in FIG. 2, when this piston (7) is displaced to the position at which the piston (7) blocks the second communication pipe (72), the pressure of the second cylinder chamber (12) increases, and the piston (7) is displaced toward the first cylinder chamber (11) (i.e., toward the left in FIG. 2). Then, the opening end of the second communication pipe (72) is made open, and the pressure of the second cylinder chamber (12) decreases again. Consequently, the piston (7) is displaced to the position at which the piston (7) blocks the opening end of the second communication pipe (72) again. In the manner described above, the piston (7) is held substantially near the opening end of the second communication pipe (72) (see FIG. 2). As a result, the slide valve (4) coupled to the piston (7) is held at a predetermined position (an intermediate position) between the first position and the second position.

In a state in which the slide valve (4) is at the intermediate position as illustrated in FIG. 8, the area of the opening of the discharge port (25) is an intermediate area (i.e., a predetermined area between the maximum area and the minimum area), and the timing of start of the discharge stroke is later than that in operation with a rated load In the state illustrated in FIG. 8(A), the suction port (24) and the helical groove (41a) have not been separated from each other yet by the gate (51). On the other hand, the helical groove (41a) and the discharge port (25) are separated from each other by the slide valve (4). Accordingly, in the helical groove (41a) in the state illustrated in FIG. 8(A), the above-described suction stroke is performed.

When the screw rotor (40) in the state illustrated in FIG. 8(A) rotates and comes to be in the state illustrated in FIG. 8(B), the suction port (24) and the helical groove (41a) are separated from each other by the gate (51). The helical groove (41a) and the discharge port (25) are separated from each other by the slide valve (4). Accordingly, in the helical groove (41a) in the state illustrated in FIG. 8(B), the suction stroke finishes, and the above-described compression stroke starts.

When the screw rotor (40) in the state illustrated in FIG. 8(B) rotates, the volume of the compression chamber (23) in the helical groove (41a) gradually decreases. Accordingly, the compression stroke continues, thereby increasing the pressure of refrigerant in the compression chamber (23). Then, the screw rotor (40) comes to be in the state illustrated in FIG. 8(C), the compression chamber (23) and the discharge port (25) communicate with each other. Consequently, the compression stroke finishes, and the above-described discharge stroke starts. As described above, in the operation with a rated load, the timing of communication between the compression chamber (23) and the discharge port (25) is the earlier than that in operation with a rated load (see FIG. 7). Thus, the discharge capacity Vd is large, and the volume ratio VI is at the intermediate volume ratio Vmid.

As illustrated in FIG. 8(D), when the screw rotor (40) further rotates, a high-pressure refrigerant gas flows out of the discharge port (25). This discharge stroke is performed until the communication between the compression chamber (23) in the helical groove (41a) and the discharge port (25) is interrupted.

<Stop Operation with Minimum VI>

In operation of the screw compressor (1), a predetermined differential pressure (a so-called level differential pressure) is generated between the discharge side and the suction side of the screw rotor (40). Specifically in operation of the screw compressor (1), the pressure of the discharge chamber (S2) is equal to the pressure in the high-pressure line of the refrigeration circuit, and the pressure of the suction chamber (S1) is equal to the pressure in the low-pressure line of the refrigeration circuit. Such a level differential pressure is notable especially in operation with the maximum VI described above. When the screw compressor (1) in this state is stopped, the level differential pressure causes the screw rotor (40) to rotate reversely, i.e., in the direction opposite to that in normal operation, resulting in that refrigerant in the discharge chamber (S2) might flow back to the suction chamber (S1) through the inside of the helical grooves (41).

In this manner, when the screw rotor (40) rotates reversely, the volume in a chamber in which refrigerant is enclosed by the gates (51) gradually increases in the helical grooves (41), and thus, this refrigerant expands, thereby reducing the pressure.

On the other hand, when the screw compressor (1) is stopped, the level differential pressure of the refrigeration circuit is quickly equalized. Accordingly, the internal pressure of the discharge chamber (S2) quickly decreases, and the internal pressure of the suction chamber (S1) quickly increases. In this state, when refrigerant in the discharge chamber (S2) with a reduced pressure as described above expands in the helical grooves (41) of the screw rotor (40) rotating in the reverse direction, the pressure of this refrigerant further decreases. On the other hand, since the internal pressure of the suction chamber (S1) quickly increases, there might occur a reverse differential pressure phenomenon in which the pressure of refrigerant expanded in the helical grooves (41) becomes lower than the internal pressure of the suction chamber (S1).

In the manner described above, when the magnitude correlation between the pressure in the helical grooves (41) and the pressure of the suction chamber (S1) is reversed from that in normal operation, a pressing force in the direction reverse to that in the normal operation is applied to the gates (51), thereby causing problems such as removal of the gates (51) from the arms (57) and accelerated abrasion of the gates (51). Specifically, in the normal operation, the internal pressure of the closed helical grooves (41) is higher than the internal pressure of the gate rotor chamber (90), and thus, the gates (51) are subjected to a pressing force applied from the insides of the helical grooves (41) toward the gate rotor chamber (90).

In the normal operation, a linear sealing is ensured in this state between the gates (51) and the screw rotor (40).

On the other hand, when the screw rotor (40) rotates reversely to cause the above-mentioned reverse differential pressure phenomenon, the internal pressure of the helical grooves (41) becomes lower than the internal pressure of the gate rotor chamber (90). Consequently, the gates (51) are subjected to a pressing force applied from the gate rotor chamber (90) toward the insides of the helical grooves (41). When the screw rotor (40) in this state further rotates reversely, the resin gates (51) might curl up on the metal arms (57) to be removed from the arms (57). In addition, when the gates (51) and the screw rotor (40) come into contact with each other at locations different from those in normal operation, abrasion of the gates (51) might be accelerated.

To solve the foregoing problems, the volume ratio VI when the screw compressor (1) stops is set at the minimum volume ratio VImin in this embodiment. Specifically, when the controller (80) outputs a stop signal for stopping the screw compressor (1), the controller (80) makes all the shut-off valves (74, 75, 76) closed.

Figure 9:
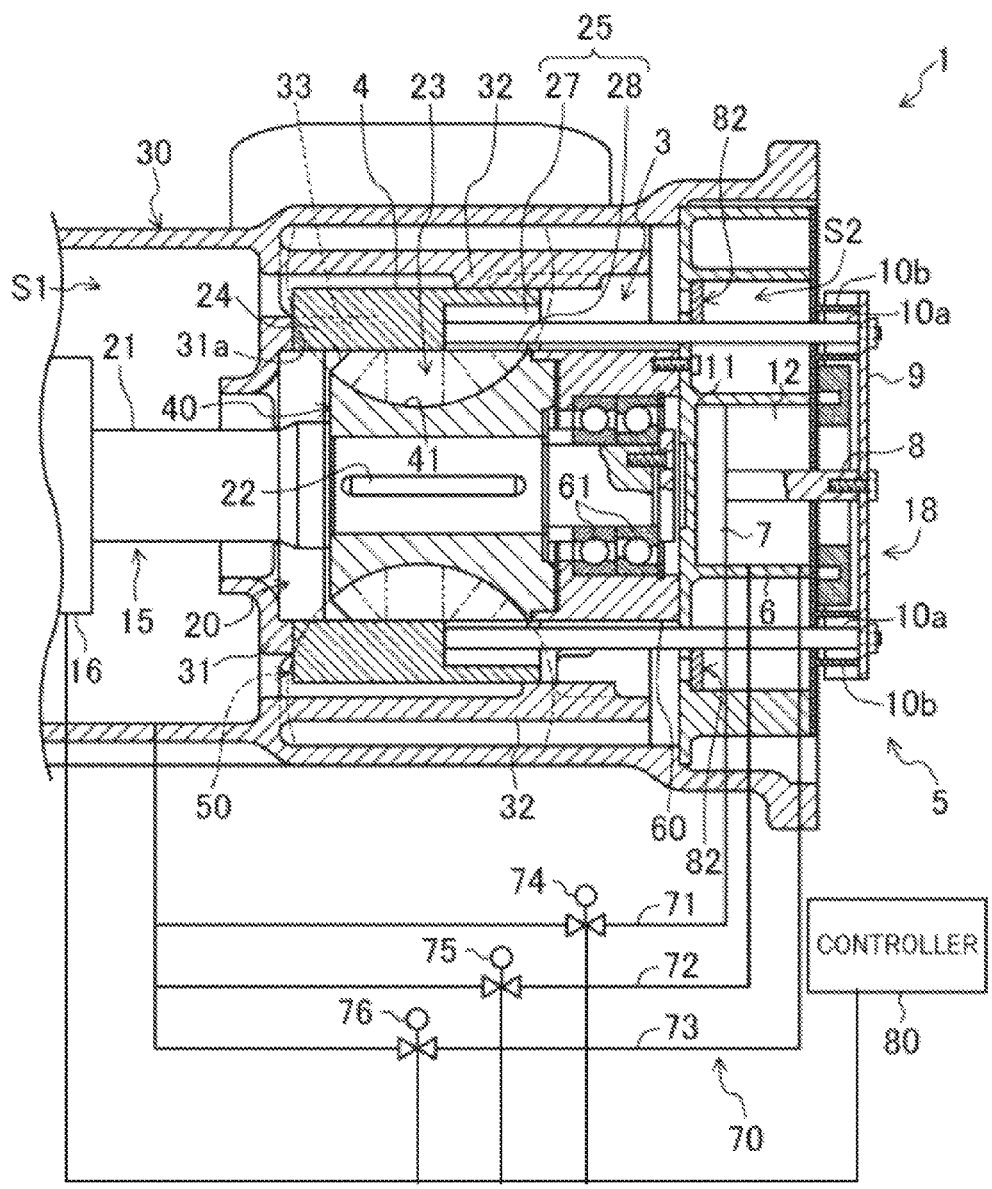
FIG. 9 is a vertical cross-sectional view illustrating a main part of the screw compressor which is stopped.

As illustrated in FIG. 9, when all the shut-off valves (74, 75, 76) are closed, the second cylinder chamber (12) is completely shut off from the suction chamber (S1), and the internal pressure of the second cylinder chamber (12) becomes equal to the internal pressure of the first cylinder chamber (11). Consequently, the slide valve (4) urged by the spring (10b) comes into contact with the contact part (31a), and is held at the first position (see FIG. 9).

After the slide valve (4) has been set at the first position, the controller (80) sends a stop signal for stopping the screw rotor (40) to the drive mechanism (15). That is, in this embodiment, immediately before the screw rotor (40) stops, the volume ratio VI is set at the minimum volume ratio VImin.

When the drive mechanism (15) is turned off to stop rotation of the screw rotor (40), refrigerant flows back because of the level differential pressure as described above. However, in this embodiment, since the volume ratio VI is set at the minimum volume ratio VImin in the case of such backflow of refrigerant, expansion of refrigerant in the helical grooves (41), and further a reverse differential pressure phenomenon, can be avoided. This advantage will be described with reference to FIG. 11. The following description will be focused on a helical groove (41b) indicated by the bold line in FIGS. 11(A)-11(D).

As illustrated in FIG. 11(A), in a state in which the discharge port (25) communicates with the inside of the helical groove (41b), high-pressure refrigerant in the discharge chamber (S2) flows from the discharge port (25) into the helical groove (41b). At the same time, the screw rotor (40) rotates reversely, i.e., in the direction (direction indicated by the arrow in FIG. 11) opposite to that in normal operation. When the screw rotor (40) further rotates reversely and comes to be in the state illustrated in FIG. 11(B), the refrigerant further flows into the helical groove (41b).

When the screw rotor (40) further rotates reversely so that the helical groove (41b) communicates with the suction port (24) (see FIG. 11(C)), the refrigerant in the helical groove (41b) flows from the suction port (24) to the suction chamber (S1). In this embodiment, in the state where the helical groove (41b) communicates with the suction port (24), this helical groove (41b) still communicates with the discharge port (25). That is, the variable VI mechanism (3) is configured such that the suction chamber (S1) and the discharge chamber (S2) communicate with each other through the helical groove (41b) by adjusting the slide valve (4) at the first position. Accordingly, while the screw rotor (40) rotates reversely, the inside of the helical groove (41b) is not closed. Thus, in the helical groove (41b), refrigerant does not expand and the pressure of the refrigerant is not reduced. In other words, in this embodiment, the expansion ratio of the screw rotor (40) during reverse rotation is substantially 1.0.

When the screw rotor (40) in the state illustrated in FIG. 11(C) further rotates, the discharge port (25) and the helical groove (41b) are separated from each other, but the helical groove (41b) and the suction port (24) still communicate with each other (see FIG. 11(D)). Accordingly, further rotation of the screw rotor (40) gradually reduces the volume of the helical groove (41b) (not shown), and the refrigerant in the helical groove (41b) flows out into the suction chamber (S1) accordingly.

As described above, in this embodiment, the volume ratio VI is at the minimum volume ratio VImin 1.0) during reverse rotation of the screw rotor (40), and thus, expansion of the refrigerant in the helical groove (41b) can be avoided. As a result, it is possible to reduce occurrence of the above-described reverse differential pressure phenomenon.

Figure 13:
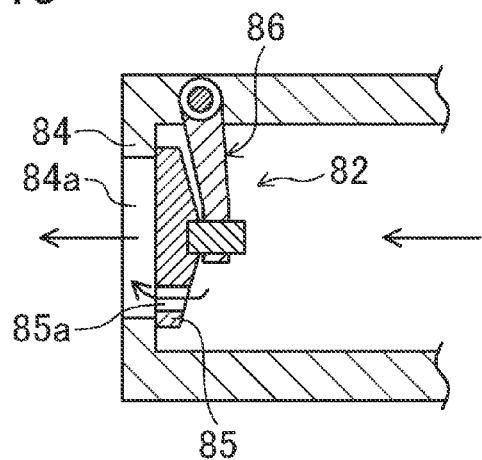
FIG. 13 is a vertical cross-sectional view illustrating the backflow resistance valve while the screw rotor rotates in the reverse direction where a backflow of a fluid is indicated by arrows.

In addition, in this embodiment, reverse direction of the screw rotor (40) itself is reduced while operation of the screw compressor (1) is stopped. Specifically, in a path through which refrigerant flows back from the discharge chamber (S2) to the discharge port (25), the refrigerant passes through the backflow resistance valve (82). In the backflow resistance valve (82), the pressure of the high-pressure refrigerant gas acts on the back end face (i.e., the right end face in FIG. 13) of the valve element (85). Accordingly, as illustrated in FIG. 13, the valve element (85) comes into contact with the valve seat (84), and is displaced to the position at which the valve element (85) closes the opening (84a). In this manner, the high-pressure refrigerant gas flows through the communication hole (85a) penetrating the valve element (85). The inner diameter of the communication hole (85a) is smaller than the inner diameter of each of paths of refrigerant at the front and back of the valve element (85) and the inner diameter of the opening (84a). Accordingly, throttling of refrigerant by the communication hole (85a) reduces the flow rate of the refrigerant flowing back toward the screw rotor (40). In this manner, in this embodiment, the reverse rotation of the screw rotor (40) itself can be reduced.

Advantages of Embodiment

In this embodiment, immediately before the screw rotor (40) stops, the volume ratio VI is set at the minimum volume ratio VImin. Accordingly, while operation of the screw compressor (1) is stopped, a reverse differential pressure phenomenon in which the pressure in the helical grooves (41) is lower than the pressure in the suction chamber (S1) can be avoided. This can reduce problems such as removal of the gates (51) from the arms (57) of the gate rotors (50) and accelerated abrasion of the gates (51). As a result, durability of the gate rotors (50) can be improved, and reliability of the screw compressor (1) can be ensured. In particular, in this embodiment, during reverse rotation of the screw rotor (40), the volume ratio VI is at the minimum volume ratio VI (=1.0), and refrigerant does not expand at all. As a result, it is possible to ensure further reduction of the reverse differential pressure phenomenon.

In addition, when refrigerant flows back because of reverse rotation of the screw rotor (40), the backflow resistance valve (82) reduces the backflow of the refrigerant. Accordingly, when operation of the screw compressor (1) is stopped, reverse rotation of the screw rotor (40) itself is reduced. Consequently, it is possible to ensure further reduction of the reverse differential pressure phenomenon due to reverse rotation of the screw rotor (40). In addition, since the revolution speed of the screw rotor (40) is reduced during the reverse rotation, abrasion of the gates (51) due to the reverse rotation can also be reduced.

Variations of Embodiment

The foregoing embodiment may be modified in the following manner.

<Other Configuration of Backflow Resistance Valve (First Variation)>

Figure 14:
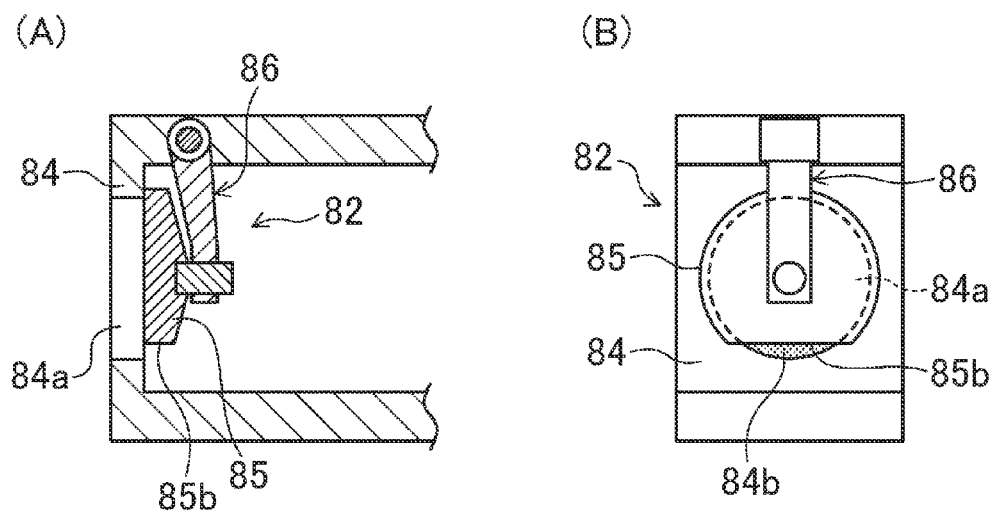
FIG. 14 schematically illustrates a backflow resistance valve according to a first variation.

The backflow resistance valve (82) may have a configuration as a first variation illustrated in FIG. 14. In the first variation, the shape of the valve element (85) is different from that of the above embodiment. Specifically, in the valve element (85) of the first variation, the outer periphery of the body of the substantially circular disc shape is partially cut out, i.e., an arch shape is removed from the outer periphery of the body of the substantially circular disc shape. That is, a flat cutout surface (85b) is formed on the outer periphery of the valve element (85). In the example of FIG. 14, the cutout surface (85b) is located at the bottom of the valve element (85). Accordingly, in the first variation, even when refrigerant flows back so that the valve element (85) is at the position at which the valve element (85) closes the opening (84a), part of the opening (84a) (a region (84b) indicated with dots in FIG. 14 (B)) is not closed by the valve element (85) and is open. Consequently, the backflow refrigerant flows toward the discharge port (25) through this exposed region (84b).

Since the area of the opening of the exposed region (84b) is smaller than the total area of the opening of the valve seat (84), the backflow refrigerant can be throttled. As a result, in the first variation, it also possible to reduce backflow of refrigerant, and further to reduce reverse direction of the screw rotor (40).

<Configuration Using Motor with Regenerative Braking as Reverse Rotation Reduction Mechanism (Second Variation)>

In the above embodiment, the backflow resistance valve (82) for reducing backflow of refrigerant is used as a reverse rotation reduction mechanism for reducing reverse direction of the screw rotor (40). Alternatively, as the reverse rotation reduction mechanism, the drive mechanism (15) illustrated in FIG. 1, for example, may be a motor with regenerative braking. In this case, when refrigerant flows back to cause reverse rotation of the screw rotor (40) with the screw compressor (1) being stopped, this drive mechanism (15) can provide braking (rotational resistance) to this reverse rotation. In the drive mechanism (15) of the first variation, kinetic energy (i.e., energy of backflow refrigerant) of the screw rotor (40) rotating reversely can be collected as electric energy. The control method for providing regenerative braking to the drive mechanism (15) may be any of various control methods such as resistance control, thyristor phase control, armature chopper control, field chopper control, field added excitation control, and VVVF inverter control.

Other Embodiments

The above embodiment may have the following configurations,

In the above embodiment, immediately after the screw rotor (40) has stopped, the volume ratio VI is adjusted to the minimum volume ratio VImin. Alternatively, when the screw rotor (40) stops, the volume ratio VI may be adjusted to the minimum volume ratio VImin. Specifically, simultaneously with output of a stop signal for stopping the drive mechanism (15) from the controller (80), an instruction for adjusting the volume ratio VI to the minimum volume ratio VI may be output to the variable VI mechanism (3). In this case, immediately after the screw compressor (1) has stopped, it is also possible to reduce occurrence of a reverse differential pressure phenomenon.

The positions of the spring (10b) described in the above embodiment are merely examples. For example, the spring (10b) may be directly connected to the slide valve (4) such that the slide valve (4) is urged toward the first position. Alternatively, the spring (10b) may be connected to the second cylinder chamber (12) such that the piston (7) is urged toward the suction chamber (S1).

The valve displacement mechanism (18) may have other configurations. Specifically, the slide valve (4) may be configured to be slidable with a small motor, for example. Instead of the communication pipes (71, 72, 73) and the shut-off valves (74, 75, 76), a single communication pipe connecting the second cylinder chamber (12) and the suction chamber (S1) together and a motor operated valve capable of minutely adjusting the opening degree of this communication pipe may be used to adjust the internal pressure of the second cylinder chamber (12).

In the above embodiment, the minimum volume ratio VImin while the screw compressor (1) is stopped is 1.0. Alternatively, the minimum volume ratio VImin may be larger than 1.0 as long as the minimum volume ratio VImin is the minimum volume ratio.

The foregoing embodiment are essentially preferred examples, and are not intended to limit the scope of the present invention, the applications thereof, or the uses thereof.

INDUSTRIAL APPLICABILITY

As described above, the present disclosure is useful for improving durability of a gate motor of a screw compressor.

What is claimed is:

1. A single-screw compressor, comprising:
a screw rotor having an outer periphery with a helical groove formed therein, a first axial end of the screw rotor forming a suction side and a second axial end of the screw rotor forming a discharge side;
a gate rotor including a plurality of radially arranged gates engaged with the helical groove;
a drive mechanism configured to rotate the screw rotor;
a cylinder configured to accommodate the screw rotor such that a compression chamber enclosing a fluid is defined in the helical groove;
a discharge port arranged such that the fluid in the compression chamber flows through the discharge port toward the discharge side of the screw rotor, and
an adjustment mechanism configured to adjust a compression ratio of the compression chamber within a predetermined range,
the adjustment mechanism being further configured to adjust the compression ratio of the compression chamber to a minimum compression ratio immediately before or when operation of the screw rotor is stopped, and including
a slide groove formed in an inner wall of the cylinder along an axis of the cylinder,
a slide valve configured to slidably fit in the slide groove to change a location where the compression chamber and the discharge port communicate with each other, and a displacement part configured to displace the slide valve such that the slide valve is at a first position closest to the suction side of the screw rotor immediately before or when operation of the screw rotor is stopped.

2. The single-screw compressor of claim 1, further comprising:
a reverse rotation reduction mechanism configured to reduce reverse rotation of the screw rotor when operation of the screw rotor is stopped.

3. The single-screw compressor of claim 2, further comprising:
a casing including a discharge chamber arranged such that the fluid flows from the discharge port to the discharge chamber; and
a discharge pipe connected to the casing such that the discharge pipe communicates with the discharge chamber,
the reverse rotation reduction mechanism including a backflow resistance part configured to provide resistance to a fluid flowing from the discharge chamber to the discharge port.

4. The single-screw compressor of claim 2 wherein
the reverse rotation reduction mechanism includes a motor of the drive mechanism, and the motor is configured with regenerative braking to provide resistance to reverse rotation of the screw rotor.

5. The single-screw compressor of claim 1, wherein
the adjustment mechanism is configured such that when the slide valve is at the first position, a space at the suction side of the screw rotor and the discharge port communicate with each other through the helical groove.

* * * * *